April 9, 1940.  A. P. FERGUESON ET AL  2,196,493
FLEXIBLE FENDER SHIELD
Filed Oct. 8, 1938  3 Sheets—Sheet 3

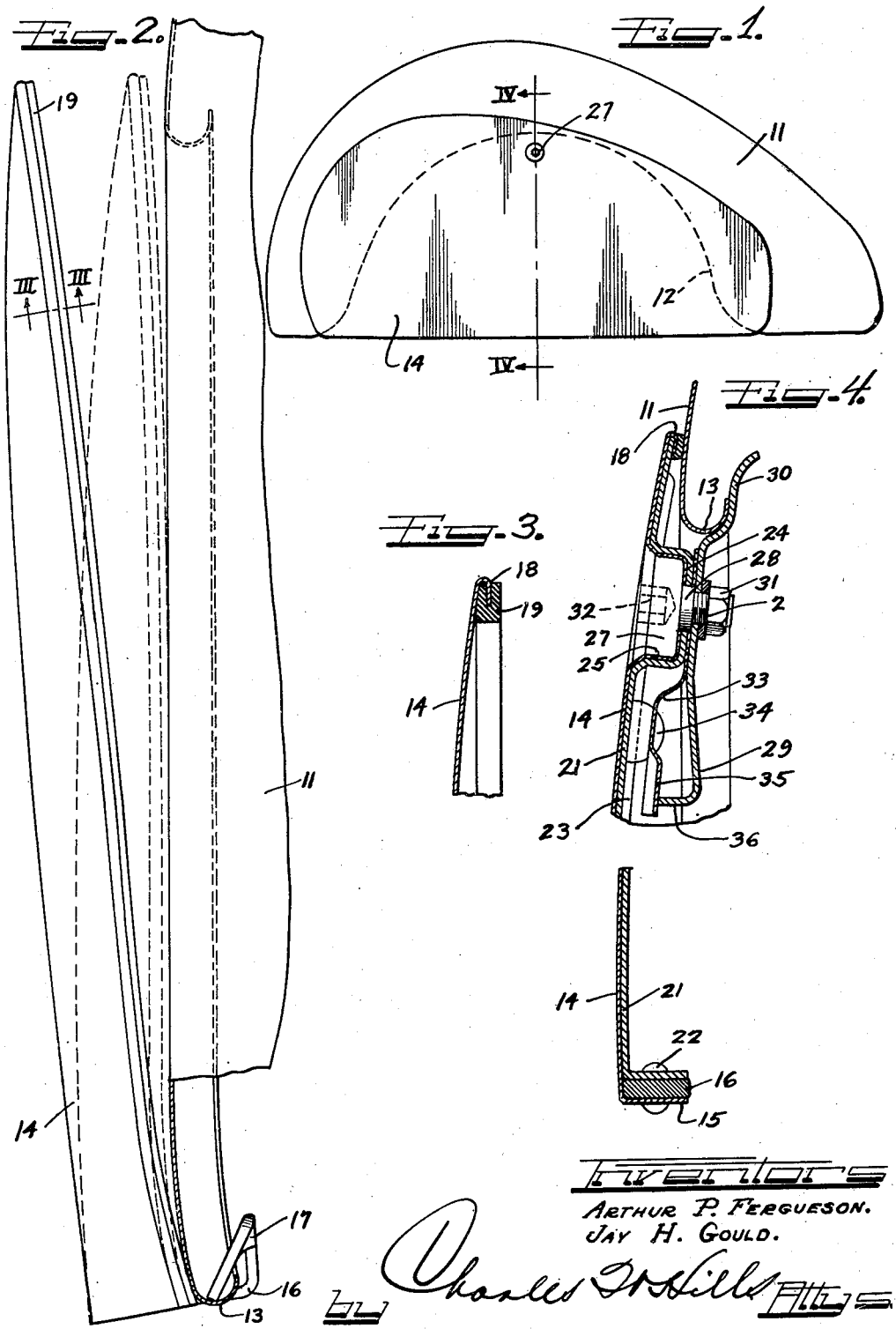

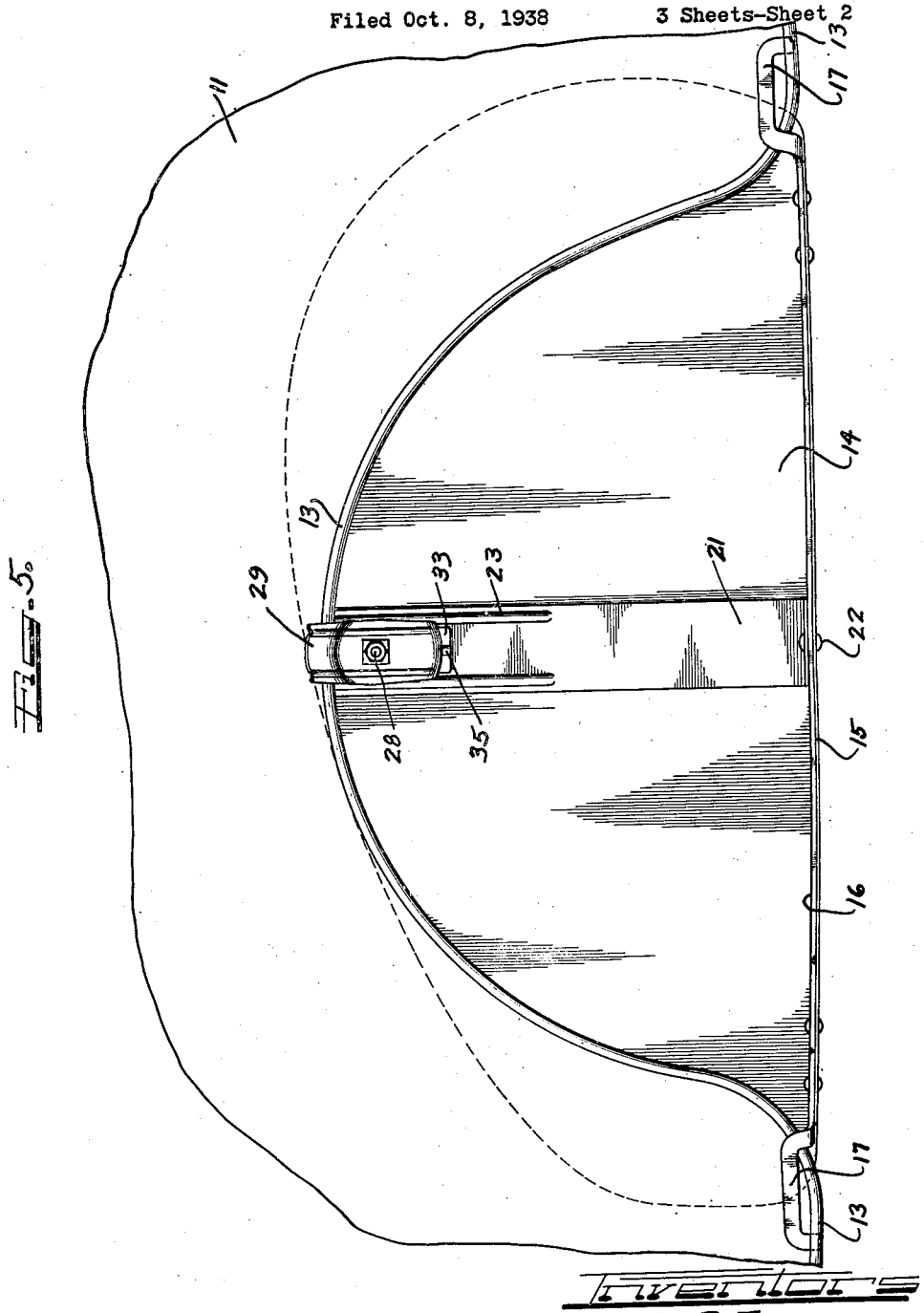

Inventors
Arthur P. Fergueson.
Jay H. Gould.

Patented Apr. 9, 1940

2,196,493

UNITED STATES PATENT OFFICE 2,196,493

FLEXIBLE FENDER SHIELD

Arthur P. Fergueson and Jay H. Gould, Detroit, Mich., assignors to Houdaille-Hershey Corporation, Detroit, Mich., a corporation of Michigan Application October 8, 1938, Serial No. 233,919

10 Claims. (Cl. 280—153)

This invention relates to devices for covering or closing the wheel access openings in the sides of the fenders or other wheel enclosures of a vehicle, particularly an automobile. Since the wheels of present-day automotive vehicles are almost universally provided with wheel enclosures in the form of fenders, our invention relates particularly to closures for use on fenders and known at the present time as "fender shields" or "fender skirts;" but this invention is equally applicable to automotive vehicles having a body wide enough to enclose the wheels without the use of fenders and in which the wheel access openings are in the side of the body itself. Bodies having such a width are to be found today only among commercial vehicles, but we wish it to be expressly understood that this invention is equally applicable to such bodies on commercial vehicles and also on private vehicles, if at some time in the future such bodies should come into use on private vehicles. Therefore, while we refer to our invention as a "fender shield," it is to be clearly understood that this term includes covers for wheel access openings in the side of a body as well as for wheel access openings in a fender.

The fender skirts which have been made before our invention have all been designed to fit partially or entirely within the wheel access opening, and their edges have been shaped to fit the edge of the opening. For this reason, every fender skirt has had an outline similar to the shape of the wheel access opening. As a result, most fender skirts have been approximately semi-circular in shape, which, of course, does not harmonize with the streamline contours of the remainder of the vehicle. It is possible to provide a "streamline" fender shield with previously known constructions by making the wheel access opening itself of streamline shape, and this has been done. This, however, is practical only when the fender shield is to be always used and is made "standard equipment" on the automobile having such wheel access openings, because such wheel access openings without fender shields allow an ugly exposure of the chassis or running gear of the vehicle.

One of the principal objects of our invention is to provide a fender shield construction which will allow a fender shield to be made streamline, or any other desired shape in outline, independently of the shape of the wheel access opening. More particularly, it is an object of our invention to provide a streamline fender shield for a fender with a non-streamline wheel access opening.

It is a further object of this invention to provide a novel means for retaining the entire fender-engaging edge portion of an ornamental fender skirt in tight engagement with the fender.

The novel features which we believe to be characteristic of our invention are set forth with particularity in the appended claims. Our invention itself, however, both as to its organization and manner of construction, together with further objects and advantages thereof, may best be understood by reference to the following description, taken in connection with the accompanying drawings, in which:

Figure 1 is a side elevational view of an automobile fender having one embodiment of our novel ornamental fender shield mounted thereon;

Figure 2 is an end elevational view, partly in section, of the embodiment of the invention shown in Figure 1 as it is being mounted in position upon the fender;

Figure 3 is a cross-sectional view through the edge of the fender shield, taken on the line III—III of Figure 2 and looking in the direction of the arrows;

Figure 4 is a vertical cross-sectional view through the fender and the fender shield, taken on the line IV—IV of Figure 1 and looking in the direction of the arrows;

Figure 5 is an inside elevation of the embodiment of the invention shown in Figure 1 as seen from the inside of the fender and looking out;

Figure 6:
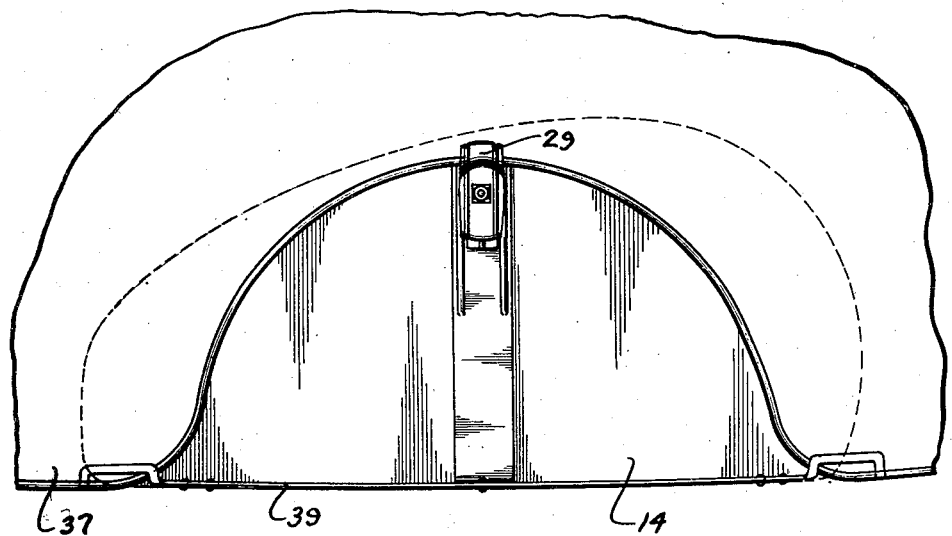
Figure 6 is an inside elevation of the fender shield panel shown in Figures 1 to 5 but provided with a shorter trunnion bar and a differently located latch and fitted to a fender having a slightly smaller wheel access opening.

The embodiment of the invention shown in the drawings is designed to be mounted upon a conventional automobile fender 11 having an approximately semicircular wheel access opening indicated by the dotted line 12 in Figure 1 and seen from the inside in Figure 2. The edge of the fender along the bottom and around the wheel access opening is curled back and up so as to form a trough-like reinforcement 13 which is U-shaped in cross section.

The fender shield comprises a sheet metal panel 14 having an approximately straight lower edge and being large enough to cover the entire wheel access opening 12. The lower edge 15 of the panel is bent back to form a horizontal flange, to the upper surface of which is riveted or otherwise secured a reinforcing bar 16. The ends of the bar 16 are bent back away from the plane of the panel 14, so as to extend behind the fender 11 when the fender shield is in place, and are formed into hooks 17 which are adapted to fit down into the trough-like reinforcement 13 along the bottom of the fender at either side of the wheel access opening. The hooks 17 serve to support the fender shield and to hold its lower corners up against the side of the fender.

The edge of the panel 14, at the ends and around the top, is folded back, as shown in Figure 3, to form a thin U-shaped reinforcement 18 which serves to hold a rubber edging 19. If desired, the rubber edging 19 may also be cemented in place.

The panel 14 is provided with a vertical stay 21 extending from the reinforcing bar 16 at the bottom of the panel up the center of the back to the doubled-back edge 18 at the top of the panel. One or more rivets 22 may be provided at the bottom of the stay 21 to secure it to the bar 16 and to the bottom flange 15 of the panel. The upper portion of the stay 21 is strengthened by a pair of embossed ridges or beads 23 extending along near its edges and is provided with a rearwardly projecting stamped circular boss 24, the interior of the boss 24 providing a shallow circular depression on the face of the stay. The panel 14 is formed with a portion 25 which fits within the boss 24, and the two parts 24 and 25 are held together by a stud 26 having a large round head 27 fitting within them.

The stem of the stud 26, which projects through registering holes in the boss 24 and the part 25 of the panel fitting within the boss, is reduced in diameter to provide a rearwardly facing shoulder and has a latch member 29 secured to it. The latch member 29 fits up against the shoulder on the stud 26 and has a hole through which the reduced portion of the stud passes and is clamped tightly against the shoulder by means of a nut 31 screwed onto the end of the stud 28, the end of the stud being threaded. Thus the latch member 29 and the nut 31 prevent the stud 26 and its head 27 from being withdrawn from the recess in the boss 24 but do not prevent it from rotating.

Suitable means are provided on the head 27 of the stud for rotating it and the latch member 29 from the front of the fender shield. This may consist of a short hexagonal projection similar to the head of a bolt which may be engaged by a wrench, but we prefer to provide the head 27 with a hexagonal hole 32 which is adapted to receive the end of a bent hexagonal bar which serves as a wrench. This construction is similar to that employed in the well-known "Allen" type of set screw.

The stud 28 also serves to support a piece of spring metal 33 which lies between the back of the boss 24 and the front of the latch member 29 and which has a hole through which the stud 28 passes. The hole in the thin sheet of spring metal 33 is as large as the hole in the boss 24 through which the stud 28 passes, so that the shoulder on the stud 28 lies in back of the piece of spring metal 33 and bears directly against the latch member 29. Thus the piece of spring metal 33 is not clamped to the stud 28 by the nut 31 along with the latch member 29 and can remain stationary while the stud 28 and latch member 29 are rotated. The spring 33 is kept from rotating by means of a pair of lugs 34 which are struck out from the stay 21 and which extend back on each side of the spring. The end of the spring 33 is formed with a radially extending rib or ridge 35, and the end 36 of the latch member 29 is formed to fit over the rib 35. Thus, when the latch member 29 is turned to the position shown in the drawings, the rib 35 will snap up into interfitting engagement with the end of the latch member and resiliently hold the latch member 29 from turning away from that position in either direction. The latch member 29 is shaped so that in this position a portion 30 extends up behind the edge 13 of the fender 11 so as to hold the top of the fender shield tightly against the face of the fender, as shown in Figure 4.

Besides being held by the stud 28 and by the inturned part 25 of the panel which fits into the recess in the front of the boss 24, the upper end of the stay 21 projects up under the folded-back edge 18 at the top of the panel. In addition to this fastening means, the stay 21 may be spot-welded to the panel 14, but the spot-welding may be omitted unless the parts are made of unusually thin gauges of metal.

An important feature of our invention is the shaping of the panel 14 of the fender shield so as to secure a tight engagement of the fender shield with the fender all around the ends and top of the fender shield. This is accomplished by forming the fender shield so that it will not fit in place without being distorted from its unstrained position. No exact mathematical formula has been derived for determining exactly how the shape of the edge of the fender shield panel 14 should depart from the shape of the portion of the fender against which it is to fit, but, by practical experience and experimentation, it has been found that the best results are secured when the following conditions are fulfilled. When the fender shield is being mounted upon the fender and is in the position shown in Figure 2, the space between the edge of the fender shield and the fender should increase as one goes from the bottom of the fender shield towards the top and should increase at an increasing rate. In other words, the edge of the fender shield should be convex relative to the surface of the fender. This does not mean that the edge of the fender shield, as seen from one end of the fender shield as in Figure 2, must be absolutely convex. It means that if the side of the fender is flat, the edge of the fender shield as viewed from one end should be convex toward the fender; if the side of the fender is convex, the edge of the fender shield as viewed from one edge should be concave but have a smaller curvature or a greater radius of curvature than the surface of the fender; and if the side of the fender should be concave, the edge of the fender shield as seen from one end should be convex and should have a greater curvature or a smaller radius of curvature than the surface of the fender. It has also been found that, when the fender shield is being swung up into position and is about to be pressed into place, that portion of the edge of the fender shield which is near the latch 36 should be further from the fender than any other portion of the edge of the fender shield.

The fender shield which we have shown as the preferred embodiment of our invention is arranged to have the edge of the panel positively held against the side of the fender at three points, that is, at the top and at each lower corner, but it is possible to construct a fender shield according to our invention which is arranged to have the edge of the panel positively held against the side of the fender at only two points and in which the rest of the edge is held in by the resiliency of the fender shield. In such a fender shield, the edge of the panel must lie on both sides of a line joining the two points that are arranged to be positively held in. Also, the panel should be curved so that if it is placed up against the side of the fender where it is to fit without being strained, the points arranged to be positively held in will be spaced out from the fender, and the edge will curve in from each of these two points into contact with the side of the fender. Then, when the two points are pressed in against the side of the fender, the panel will be strained into position and the entire edge will press in tightly against the side of the fender.

The procedure of mounting the fender shield upon the fender is as follows: The fender shield is held with its lower edge adjacent to the lower edge of the fender and with the body of the fender shield tipped out away from the fender at an angle considerably greater than that shown in Figure 2. Then the fender shield is lifted and the hooks 17 passed up behind the trough-like edge at the bottom of the fender and are brought forward and down until they are in the position shown in Figure 2. The fender shield is then swung up into the position shown in dotted lines in Figure 2 into tight contact with the side of the fender, whereupon the latch 29 may be rotated into latching position. This completes the placing of the fender shield in position. When in position, it will be found that the entire edge of the fender shield presses tightly against the side of the fender, metal-to-metal contact being prevented by the rubber lining 19, and that no rattles or other noises can occur.

To dismount the fender shield from the fender, it is simply necessary to rotate the latch to its unlatched position and allow it to spring out. The entire fender shield may then be lifted until the hooks 17 are disengaged from the underturned trough-like edge 13 of the fender, whereupon the entire fender shield may be readily removed.

Figure 7:
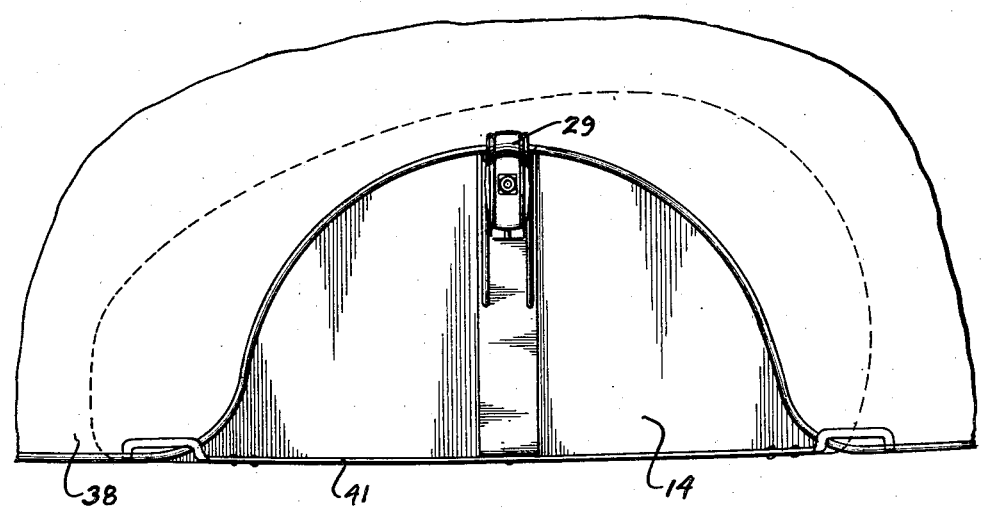
Figure 7 is a view similar to Figure 6 and showing the same fender shield panel fitted to a fender having a still smaller wheel access opening.

An important advantage of our invention is that no part of the panel 14 forming the major part of the fender shield assembly fits within the wheel access opening in the fender. Thus the same fender shield panel 14 may, as shown in Figures 5, 6 and 7, be used on different fenders 11, 37 and 38 having different sizes of wheel access openings merely by being provided with different trunnion bars 16, 39 and 41 and by changing the location of the latch 29.

From the above description, it will be apparent that we have provided an extraordinary simple means for securing an ornamental fender shield to a vehicle fender in such a way that it will fit tightly all around its periphery. It will also be apparent that we have provided a fender shield which will fit tightly irrespective of slight variations in the size of the wheel access openings in the fender and that the same fender shields may even fit slightly different styles of fenders, such as are often found on different models of cars of the same make or manufacture. Although the ornamental fender shield has been described as being of the type supported by hooks, sometimes termed "trunnions," at the bottom, it will be obvious to those skilled in the art that the fender skirt may be supported at its bottom in any one of many different ways without departing from the spirit and scope of this invention.

It will also be apparent that we have provided a fender shield of much more pleasing appearance than any that have previously been constructed and that this is possible because our new mechanical structure permits the outline of the fender shield to be independent, to a very large extent, from the shape of the wheel access opening. It is our new mechanical structure which makes practical the fitting of a streamlined fender shield to an ordinary semicircular wheel access opening, and it is this mechanical structure which is described and claimed in this patent specification.

While we have shown one particular embodiment of our invention, it will of course be understood that we do not wish to be limited thereto, as many modifications may be made, and we therefore contemplate by the appended claims to cover all such modifications as fall within the true spirit and scope of our invention. It is also to be understood that the term "side of a vehicle" as used in the claims includes the side of the fender of a vehicle and that the term "fender" includes the side of a vehicle body where the body itself, rather than a separate fender, encloses a wheel.

We claim as our invention:

1. A fender shield for closing the wheel access opening in the side of a vehicle fender comprising a sheet metal panel, means for securing the bottom of the panel across the bottom of the opening, and means for securing the top of the panel against the side of the fender above said opening, said panel being resilient and, when unstrained, having the greater part of the edge thereof convex relative to the side of the fender against which said edge is to fit whereby said panel is strained when forced against the side of said fender and held by said securing means.

2. A fender shield for closing the wheel access opening in the side of a vehicle fender having an underturned edge around said opening and at the bottom of each side of said opening, comprising a resilient sheet metal panel, the lower edge of said panel terminating at corners of the panel and being adapted to span the bottom of said opening, hooks projecting from the back of said panel adjacent said corners and terminating in portions adapted to fit on top of said underturned edges at the sides of said opening, and a latch at the top of said panel for engaging the back of said underturned edge and holding said panel in strained condition with the upper edge thereof from one of said corners to the other in contact with the side of the vehicle, the greater part of the edge of said panel being convex relative to the contacted surface around said opening when said panel is unstrained.

3. A removable cover for a wheel access opening in the side of a vehicle having an underturned edge around the opening and at the bottom at each side of said opening, said cover comprising a resilient sheet metal panel, the lower edge of said panel terminating at corners of the panel and being adapted to span the bottom of said opening, hooks projecting from the back of said panel adjacent said corners and terminating in portions adapted to fit on top of said underturned edges at the sides of said opening, and a latch at the top of said panel for engaging the back of said underturned edge and holding said panel in strained condition with the upper edge thereof, from one of said corners to the other, in contact with the side of the vehicle, said panel having the greater part of its edge convex relative to the surface around said opening against which said upper edge is to fit when said panel is unstrained.

4. A removable cover for a wheel access opening in the side of a vehicle comprising a sheet metal panel adapted to cover said opening, a reinforcing bar fixed along the bottom of the panel and having ends projecting beyond the ends of the panel and adapted to hold the ends of the panel up and against the side of said vehicle at the sides of said opening, a flat upright stay fitting against the back of said panel and having its lower end fixed to said bar, said stay having a recess near its upper end, at least the mouth of said recess being conical and said panel having a conical portion fitting in said conical mouth, a stud having a head with a conical portion fitting over and holding the conical portion of said panel and the conical mouth of said recess in close interfitting engagement so as to prevent lateral movement therebetween, said stud also having a shank journalled in a hole in the back of said recess and extending through said hole, and a latch member fixed to said shank in back of said stay so as to hold the head of said stud in position in said recess and so as to be rotatable by said stud into a position holding the top of said cover against the side of said vehicle.

5. A removable cover for a wheel access opening in the side of a vehicle having an underturned edge around the opening and at each side of the bottom thereof, said cover comprising a resilient sheet metal panel having a lower edge terminating at corners of the panel, means for supporting said corners on said underturned edge and holding them against the side of the vehicle at the sides of said opening, and means for engaging the back of said underturned edge at the top of said opening and holding the top of said panel in contact with the side of the vehicle, said panel when unstrained having the greater part of its edge convex relative to the surface around said opening against which said upper edge is to fit whereby said panel must be strained to get the top thereof against the side of said vehicle simultaneously with the corners thereof, and whereby the upper edge of said panel will press tightly against said vehicle side along a major portion of the length thereof.

6. A removable cover for a wheel access opening in the side of a vehicle comprising a sheet metal panel adapted to cover said opening, a reinforcing bar fixed along the bottom of the panel and having ends projecting beyond the ends of the panel and adapted to hold the ends of the panel up and against the side of said vehicle at the sides of said opening, a flat upright stay fitting against the back of said panel and having its lower end fixed to said bar, said stay having a circular recess near its upper end and said panel having a portion fitting into said recess, a stud having a head rotatably fitting in said recess and having a shank journalled in a hole in the back of said recess, and a latch member fixed to said stud in back of said stay.

7. A removable cover for a wheel access opening in the side of a vehicle comprising a sheet metal panel adapted to cover said opening, a reinforcing bar fixed along the bottom of the panel and having ends projecting beyond the ends of the panel and adapted to hold the ends of the panel up and against the side of said vehicle at the sides of said opening, a flat upright stay fitting against the back of said panel and having its lower end fixed to said bar, said stay having a circular recess near its upper end and said panel having a portion fitting into said recess, a stud having a head rotatably fitting in said recess and overlying a portion of said panel, said stud also having a shank journalled in a hole in the back of said recess and extending through said hole, and a latch member fixed to said stud in back of said stay so as to be rotatable by said stud into a position holding the top of said cover against the side of said vehicle.

8. A removable cover for a wheel access opening in the side of a vehicle comprising a resilient sheet metal panel adapted to cover said opening and have the edge thereof bear against said side around said opening, and engageable and releasable means for positively holding two points spaced along said edge tightly against said vehicle side, said points being located so that said edge lies on both sides of a straight line extending through said points, and said panel being curved relative to said vehicle side so that if said panel is placed up against said vehicle side where said panel is to fit without being strained, said panel edge will be spaced out from said vehicle at said two points and will curve in from each of said two points into contact with said vehicle side whereby the engagement of said holding means will hold said cover in a strained position with the edge thereof bearing against said side around said opening.

9. A wheel housing shield for disposition over the wheel opening of a downwardly depending side wall of a vehicle body part, supporting means for detachably holding a portion of said shield on said side wall of said body part, a peripheral edge of said shield being developed so that it gradually diverges from said side wall beginning at said securement point and reaching a maximum at a point remote therefrom, and latching means in proximity to the point of maximum divergence for pulling the entire peripheral edge of said shield into tight engagement with said side wall of said body part.

10. As an article of manufacture, a fender shield having a curved peripheral edge and a substantially straight lower edge, trunnion members at the lower corners of said shield for vertically supporting said shield in rocking engagement on a vehicle fender, the peripheral edge of said shield being developed so that it gradually diverges from the side of said fender, reaching a maximum in proximity to the top of said fender shield, and latching means for pulling and retaining the peripheral edge of said shield in tight engagement with said fender.

ARTHUR P. FERGUESON.
JAY H. GOULD.